United States Patent
Shaked et al.

(10) Patent No.: US 7,570,831 B2
(45) Date of Patent: Aug. 4, 2009

(54) SYSTEM AND METHOD FOR ESTIMATING IMAGE NOISE

(75) Inventors: Doron Shaked, Haifa (IL); Hila Nachlieli, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 10/835,969

(22) Filed: Apr. 29, 2004

(65) Prior Publication Data

US 2005/0244075 A1 Nov. 3, 2005

(51) Int. Cl.
G06K 9/40 (2006.01)
H04N 5/00 (2006.01)

(52) U.S. Cl. .................. 382/260; 382/263; 382/264; 382/275; 348/607

(58) Field of Classification Search ............... 382/260, 382/263, 264
See application file for complete search history.

(56) References Cited

U.S. PATENT DOCUMENTS

| | | | | |
|---|---|---|---|---|
| 4,463,375 A * | 7/1984 | Macovski | ............... | 378/98.12 |
| 4,827,528 A * | 5/1989 | Macovski | ............... | 382/263 |
| 5,363,209 A | 11/1994 | Eschbach et al. | | |
| 5,657,401 A * | 8/1997 | De Haan et al. | ............... | 382/275 |
| 5,867,606 A | 2/1999 | Tretter | | |
| 5,987,185 A * | 11/1999 | Suzuki | ............... | 382/263 |
| 6,118,906 A | 9/2000 | Keyes et al. | | |
| 6,172,718 B1 * | 1/2001 | Alvarez et al. | ............... | 348/625 |
| 6,175,657 B1 * | 1/2001 | Mancuso et al. | ............... | 382/261 |
| 6,195,132 B1 * | 2/2001 | Kimura et al. | ............... | 348/618 |
| 6,233,357 B1 * | 5/2001 | Li et al. | ............... | 382/248 |
| 6,285,801 B1 | 9/2001 | Mancuso et al. | | |
| 6,795,588 B1 * | 9/2004 | Nio et al. | ............... | 382/261 |
| 6,891,977 B2 * | 5/2005 | Gallagher | ............... | 382/263 |
| 6,937,772 B2 * | 8/2005 | Gindele | ............... | 382/240 |
| 7,046,857 B2 * | 5/2006 | McCarthy et al. | ............... | 382/254 |
| 7,203,337 B2 * | 4/2007 | Heyden | ............... | 382/103 |
| 7,266,246 B2 * | 9/2007 | Shaked et al. | ............... | 382/232 |
| 2002/0097911 A1 | 7/2002 | de Queiroz | | |
| 2002/0131647 A1 | 9/2002 | Matthews | | |
| 2003/0035581 A1 | 2/2003 | Islam | | |
| 2003/0215153 A1 * | 11/2003 | Gindele et al. | ............... | 382/254 |
| 2006/0039622 A1 * | 2/2006 | Casale et al. | ............... | 382/266 |

FOREIGN PATENT DOCUMENTS

EP 1168824 1/2002

(Continued)

OTHER PUBLICATIONS

Deriche, "Fast Algorithm For Low-Level Vision", IEEE 9th International Conference of Pattern Recognition, vol. 1, Nov. 14-17, 1988, pp. 434-438.*

(Continued)

*Primary Examiner*—Brian P Werner
*Assistant Examiner*—Jose M Torres

(57) ABSTRACT

A method for estimating image noise. Image data for at least one column of pixels and at least one row of pixels of the image is sampled. At least one filter is applied on sampled image data resulting in at least one sequence of filtered values. A feature set of pixels of the image is selected. Image noise estimation is determined based on at least one of the filtered values of the feature set of pixels.

30 Claims, 3 Drawing Sheets

FOREIGN PATENT DOCUMENTS

EP          1205878        5/2002

OTHER PUBLICATIONS

Saha et al., "An Analysis on the Effect of Image Activity on Lossy Coding Performance", IEEE International Symposium on Circuits and Systems, May 28-31, 200, Geneva, Switzerland, pp. III-295-III-298.*

Saha et al., "An Analysis on the Effect of Image Activity on Lossy Coding Performance", IEEE International Symposium on Circuits and Systems, May 28-31, 2000, Geneva, Switzerland, pp. 111-295-111-298.*

Jung, et al.; "Univariant Assessment of the Quality of Images"; pp. 354-364; Journal of Electronic Imaging; Jul. 2002.

Kundar, et al.; "Blind Image Deconvolution"; pp. 43-64; IEEE Signal Processing Magazine; May 1996.

Acton, et al.; "Nonlinear Image Estimation Using Piecewise and Local Image Models"; pp. 979-991; IEEE Transactions on Image Processing; Jul. 1998.

Kayargadde, et al.; "An Objective Measure for Perceived Noise"; pp. 187-206; Signal Processing 49; 1996 Elsevier Science.

Liu, et al.; "Defficient DCT-Domain Blind Measurement and Reduction of Blocking Artifacts"; pp. 1139-1149; IEEE Transaction on Circuits and Systems for Video Technology; Dec. 2002.

Fan, et al.; "Identification of Bitmap Compression History; JPEG Detection and Quantizer Estimation"; pp. 230-235; IEEE Transactions on Image Processing; Feb. 2003.

Yu, et al.; "A Triage Metric for Determining the Extent of DCT-Based Compression Artifacts in a Digital Image"; pp. 443-452; Journal of Imaging Science and Technology; Oct. 2002.

Katajamaki, et al.; "Objective Quality Potential Measures of Natural Color Images"; pp. 250-263; Journal of Imaging Science and Technology; May/Jun. 1998.

Nill, et al.; "Objective Image Quality Measure Derived From Digital Image Power Spectra"; pp. 813-825; Optical Engineering, Apr. 1992.

Chan, et al.; "Modeling and Validation of a Psychovisually Based Image Quality Evaluator for DCT-Based Compression"; pp. 485-495; Signal Processing Image Communication; 2002 Elsevier Science.

* cited by examiner

SYSTEM AND METHOD FOR ESTIMATING IMAGE NOISE

TECHNICAL FIELD

Embodiments of the present invention relate to the field of image processing.

BACKGROUND ART

Image processing is a process by which an imaging application alters input image data. For example, image processing may be used to change the color space of a digital image. Image processing may be implemented in conjunction with a printing device in order to adjust the color appearance or perceived sharpness of an image according to the specifications of the printing device. Often, an image includes noise artifacts that reduce image quality of the image.

Sharpening noisy images typically results in unwanted noise enhancement. Furthermore, many typical denoising techniques are based on the extent of noise in the image. Noise estimation techniques are used to estimate image noise. A major problem with noise estimation in natural images is differentiating between noisy regions and textured regions. Currently, there are several methods of image noise estimation. However, the current available methods each present certain operational drawbacks or limitations.

One current method estimates noise within the context of an image sharpening system by the standard deviation of unsharp mask values in pixels with low local gradients. However, computations of pixel gradients and averages are intensive. In particular, these computations employ two-dimensional filters over the full image. Since this method is computationally intensive, a substantial contribution of computing resources is required, thereby providing limited applicability.

Other current methods for noise estimation include analysis of the distribution of the local gradient amplitude, analysis of the power spectrum of the image in order to estimate the variance of additive white noise, analysis of the mode relating to the smallest gradient value in a bivariate histogram of smoothed gradient and smooth luminance. Similar to the above described method, these methods are computationally intensive, and therefore provide inefficient noise estimation.

SUMMARY OF THE INVENTION

Various embodiments of the present invention, a method and system for estimating image noise, are described herein. Image data for at least one column of pixels and at least one row of pixels of the image is sampled. At least one filter is applied on sampled image data resulting in at least one sequence of filtered values. A feature set of pixels of the image is selected. Image noise estimation is determined based on at least one of the filtered values of the feature set of pixels.

BRIEF DESCRIPTION OF THE DRAWINGS

The accompanying drawings, which are incorporated in and form a part of this specification, illustrate embodiments of the invention and, together with the description, serve to explain the principles of the invention. The drawings referred to in this description should be understood as not being drawn to scale except if specifically noted.

BEST MODE FOR CARRYING OUT THE INVENTION

Reference will now be made in detail to various embodiments of the invention. While the invention will be described in conjunction with these embodiments, it will be understood that they are not intended to limit the invention to these embodiments. On the contrary, the invention is intended to cover alternatives, modifications and equivalents as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Aspects of the present invention may be implemented in a computer system that includes, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

Figure 1:
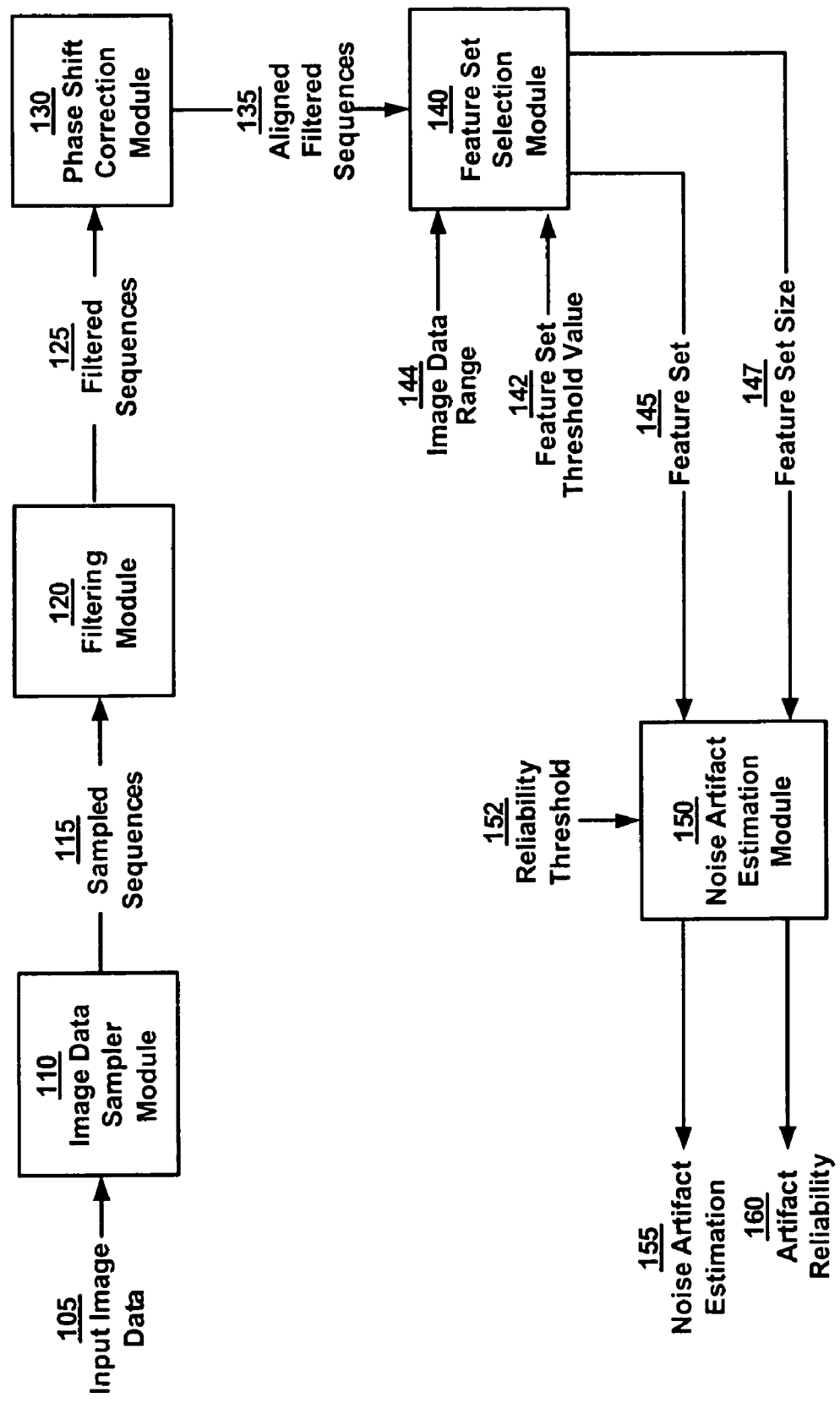
FIG. 1 is a block diagram of system for estimating noise artifacts of an image, in accordance with an embodiment of the present invention.

FIG. 1 is a block diagram of system 100 for estimating noise artifacts of an image, in accordance with an embodiment of the present invention. System 100 utilizes sampled data of an image to determine an estimation of image noise. System 100 comprises image data sampler module 110, filtering module 120, phase shift correction module 130, feature set selection module 140, and noise artifact estimation module 150. It should be appreciated that system 100 may be implemented within a computer system as software or as hardware. For example, a module may be a piece of software code, a hardware device, or a portion of a hardware device.

System 100 receives input image data 105 at image data sampler module 110. In one embodiment, input image data 105 is a Joint Photographic Experts Group (JPEG) image. It should be appreciated that any form of image data, such as Tagged Image File Format (TIFF), Graphics Interchange Format (GIF), a bitmap, and other form may be used. Input image data 105 includes luminance information and color information. It should be appreciated that image data 105 may also include other image information. In one embodiment, the color information includes Red-Green-Blue (RGB) color scheme data. In another embodiment, the color information includes Cyan-Magenta-Yellow-Black (CMYK) color scheme data. Input image data 105 includes a pixel grid, in which a particular pixel has associated image data. For example, a pixel of the pixel grid includes associated luminance value and color information.

Image data sampler module 110 is configured to sample image data from a portion of pixels of input image data 105. In one embodiment, the sampled image data is a luminance value for a pixel. In another embodiment, the sampled image data is a color value for a pixel. In another embodiment, the sampled image data are some transform of the image values, such as sequential differences. In one embodiment, image data from at least one column of pixels and one row of pixels is sampled. In one embodiment, image data from pixels of every Mth row and every Nth column is sampled, wherein M and N are positive integers. In one embodiment, M and N are equal. In another embodiment M and N are equal to the image size (e.g., the image is not sampled at all). The sequences of sampled image data (e.g., sampled sequences 115) are associated with a particular column or row of pixels. Sampled sequences 115 are then forwarded to filtering module 120.

In one embodiment, image data sampler 110 is configured to resample the sampled data. By resampling the sampled data, image data sampler 110 treats the sampled data as input image data, and samples image data from pixels of every Mth row and every Nth column of the sampled data, wherein M and N are positive integers. Thus, resampling the sampled data emulates the sampling of the image if the image was a smaller size. In other words, resampling the sampled data corrects for the size of the image. In one embodiment, the sequences of sampled data are resampled, wherein every k value is kept in a resampled sequence. The resampled sequences are included in sampled sequences 115, and are forwarded to filtering module 120.

Filtering module 120 is operable to filter either sampled sequences 115 or sequential differences of sampled sequences 115. It should be appreciated that the sequential differences can be determined at sampler module 110, filtering module 120, or in a separate module. For example, the sequential difference determination may be factored in to individual filters of filtering module 120. In one embodiment, filtering module 120 includes a low pass filter for filtering sampled sequences 115 and a high pass filter for filtering sampled sequences 115. However, it should be appreciated that filtering module 120 may use more or different filters. For example, if an individual filter of filtering module 120 is configured to determine the sequential difference values of sampled sequences 115, the low pass filter may be replaced with a band pass filter. In one embodiment, the filters of filtering module 120 are 6-tap Infinite Impulse Response (IIR) filters. However, it should be appreciated that any filter may be used.

Filtering module 120 applies the filters to sampled sequences 115 to generate filtered sequences 125. For example, where filtering module 120 includes two filters, at least one first filtered sequence of first filtered values associated with a first filter and at least one second filtered sequence of second filtered values associated with a second filter are generated. In one embodiment, where filtering module 120 includes a low pass filter and a high pass filter, at least one low pass sequence of low pass values and at least one high pass sequence of high pass values, respectively, are generated.

In one embodiment, a phase shift between filtered sequences 125 occurs as a result of the filtering. In one embodiment, filtered sequences 125 are transmitted to phase shift correction module 130 in order to compensate for the phase shift. Phase shift correction module 130 is operable to align filtered sequences 125, resulting in aligned filtered sequences 135. Aligned filtered sequences 135 are then transmitted to feature set selection module 140. It should be appreciated that, in various embodiments, no phase shift occurs between filtered sequences 125. In these embodiments, filtered sequences 125 are already aligned, thus obviating the need for phase shift correction module 130. Therefore, phase shift correction module 130 is optional.

Feature set selection module 140 is operable to select a feature set of pixels of the image. In one embodiment, feature set 145 includes smooth pixels, wherein a pixel is smooth if the filtered values of the pixel and at least one neighboring pixel are below a threshold value. In one embodiment, feature set 145 is selected from pixels corresponding to a portion of aligned filtered sequences 135. In one embodiment, feature set selection module 140 receives additional data such as feature set threshold value 142. It should be appreciated that feature set threshold value 142 may be automatically generated or user-defined. Feature set selection module 140 compares feature set threshold value 142 to the filtered values of one of aligned filtered sequences 135. If the filtered value is less than feature set threshold value 142, the corresponding pixel is selected as a pixel of feature set 145. It should be appreciated that a value based on the filtered value may be compared to feature set threshold value 142. For example, filtered value squared may be compared to feature set threshold value 142. It should be appreciated that a value based on the corresponding values of two or more different aligned filters may be compared to feature set threshold value 142. Feature set 145 includes the aligned filtered values for the selected pixels.

In some images, highlights or shadows appear in regions where there may be a significant amount of activity, changing the intensity of the signals. The signals are usually muted in highlights and shadow regions. Measuring for noise in a highlight or shadow region may result in the image appearing to have less noise than it actually has. In order to reduce the effects of pixels in highlight or shadow regions, feature set 145 may be further constrained to include pixels in which the image data value is neither too high nor too low. In one embodiment, feature set selection module 140 is operable to further constrain feature set 145 by excluding pixels that are in highlight or shadow regions. In one embodiment, feature set selection module 140 receives image data range 144. It should be appreciated that image data range 144 may be automatically generated or user-defined. For example, image data range 144 may be calculated or otherwise extracted from data relating to acquisition or image processing history of the image. This data might be embedded in one of the image tags in the input image file, or otherwise associated with the input image (such as in a database). Feature set selection module 140 compares image data range 144 to the image data value for pixels of aligned filtered sequences 135. If the image data value is within image data range 144, the corresponding pixel is selected as a pixel of feature set 145. Feature set 145 is then transmitted to noise artifact estimation module 150. In one embodiment, feature set size 147 is also transmitted to noise artifact estimation module 150, in which feature set size 147 indicates the number of pixels of feature set 145.

Noise artifact estimation module 150 is operable to estimate noise artifact estimation 155 based on a portion of the aligned filtered sequences 135 for pixels of feature set 145. In one embodiment, noise artifact estimation 155 is determined by calculating the average of the absolute value of the filtered values corresponding to one filter of filtering module 120 for pixels of feature set 145. In one embodiment, the filtered values correspond to a high pass filter of filtering module 120. In another embodiment, noise artifact estimation 155 is calculated as the variance of the filtered values corresponding to one filter of filtering module 120 for pixels of feature set 145.

In one embodiment, noise artifact estimation module 150 is also operable to determine artifact reliability 160. Artifact reliability 160 can be based on feature set size 147, where a larger feature set size 147 indicates a higher artifact reliability 160. In one embodiment, noise artifact estimation module 150 receives reliability threshold 152. It should be appreciated that reliability threshold 152 may be automatically generated or user-defined. Feature set size 147 is compared to reliability threshold 152. If feature set size 147 is greater than reliability threshold 152, the reliability is determined to be sufficient, as indicated by artifact reliability 160.

Figure 2:
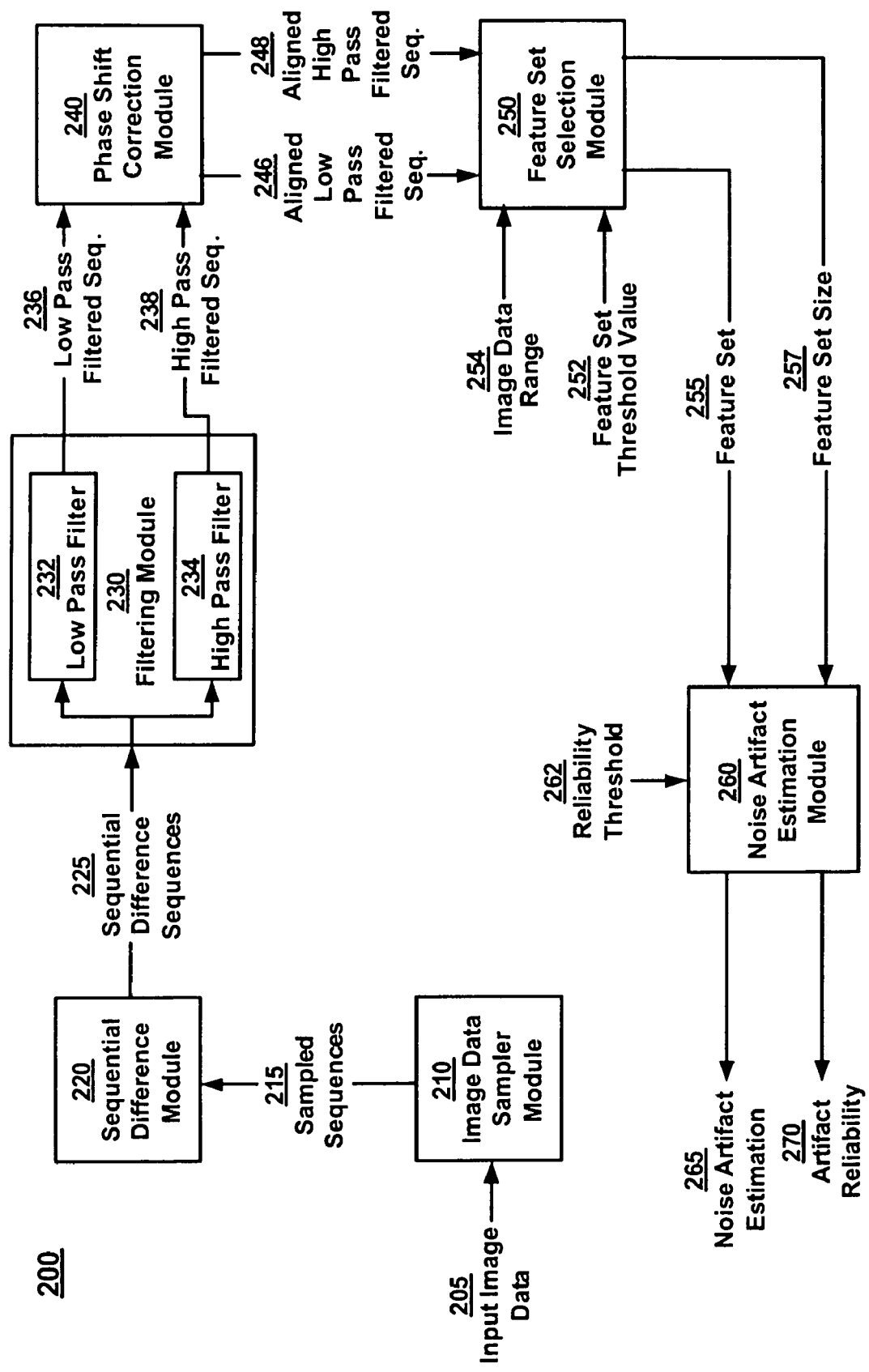
FIG. 2 is a block diagram of another system for estimating noise artifacts of an image, in accordance with an embodiment of the present invention.

FIG. 2 is a block diagram of system 200 for estimating noise artifacts of an image, in accordance with an embodiment of the present invention. System 200 is a detailed embodiment of system 100 of FIG. 1, and operates in a similar manner. System 200 utilizes sampled data of an image to estimate noise artifacts. System 200 comprises image data sampler module 210, sequential difference module 220, filtering module 230, phase shift correction module 240, feature set selection module 250, and noise artifact estimation module 260. It should be appreciated that system 200 may be implemented within a computer system as software or as hardware. For example, a module may be a piece of software code, a hardware device, or a portion of a hardware device.

System 200 receives input image data 205 at image data sampler module 210. In one embodiment, input image data 205 is a JPEG image. It should be appreciated that any form of image data, such as TIFF, GIF, a bitmap, and other form may be used. Input image data 205 includes luminance information and color information. It should be appreciated that image data 205 may also include other image information. In one embodiment, the color information includes RGB color scheme data. In another embodiment, the color information includes CMYK color scheme data. Input image data 205 includes a pixel grid, in which a particular pixel has associated image data. For example, a pixel of the pixel grid includes associated luminance value and color information.

Image data sampler module 210 is configured to sample image data from a portion of pixels of input image data 205. In one embodiment, the sampled image data is a luminance value for a pixel. In another embodiment, the sampled image data is a color value for a pixel. In one embodiment, image data from at least one column of pixels and one row of pixels is sampled. In one embodiment, image data from pixels of every Mth row and every Nth column is sampled, wherein M and N are positive integers. In one embodiment, M and N are equal. In another embodiment M and N are equal to the image size (e.g., the image is not sampled at all). The sequences of sampled image data (e.g., sampled sequences 215) are associated with a particular column or row of pixels. Sampled sequences 215 are then forwarded to sequential difference module 220. A sampled sequence $P_j$ of sampled sequences 215 may be denoted as $P_j$, j=1, 2, 3, 4, . . . , k*N.

In one embodiment, image data sampler 210 is configured to resample the sampled data of sampled sequences 215. Resampling the sampled data emulates the sampling of the image if the image was a smaller size. In other words, resampling the sampled data corrects for the size of the image. In one embodiment, the sequences of sampled data are resampled, wherein every k value is kept in a resampled sequence. A resampled sequence may be denoted as $X_i=P(k*i)$, where i=1 . . . N. In one embodiment, k=2. The resampled sequences are included in sampled sequences 215, and are forwarded to filtering module 230.

Sequential difference module 220 is operable to determine the sequential differences between the sampled values of sampled sequences 215. In one embodiment, a sequential difference $Y_i$ of sequential difference sequences 225 is calculated according to $Y_i=X_{(i+1)}-X_i$, i=1, 2, . . . N−1. As described in FIG. 1, it should be appreciated that the sequential differences determination can be combined into filtering module 230.

Filtering module 230 is operable to filter sequential difference sequences 225. In one embodiment, filtering module 230 includes low pass filter 232 and high pass filter 234 for filtering sequential difference sequences 225. However, it should be appreciated that filtering module 230 may use more or different filters. For example, if an individual filter of filtering module 230 is configured to determine the sequential difference values of sampled sequences 215 (e.g., there is no sequential difference module 220), the low pass filter may be replaced with a band pass filter. In one embodiment, low pass filter 232 and high pass filter 234 are 6-tap Infinite Impulse Response (IIR) filters. However, it should be appreciated that any filter may be used. In one embodiment, low pass value $L_i$ is calculated according to Equation 1 and high pass value $H_i$ is calculated according to Equation 2:

$$L_i = a_3*Y_{(i-3)} + a_2*Y_{(i-2)} + a_1*Y_{(i-1)} + a_0*Y_i - [b_3*L_{(i-3)} + b_2*L_{(i-2)} + b_1*L_{(i-1)}] \quad (1)$$

wherein $a_3$, $a_2$, $a_1$, $a_0$, $b_3$, $b_2$ and $b_1$ are design parameters of a 6-tap IIR filter. In one embodiment, $a_3=a_0=0.0029$, $a_1=a_2=0.0087$, $b_3=-0.5321$, $b_2=1.9294$, and $b_1=-2.3741$.

$$H_i = c_3*Y_{(i-3)} + c_2*Y_{(i-2)} + c_1*Y_{(i-1)} + c_0*Y_i - [d_3*H_{(i-3)} + d_2*H_{(i-2)} + d_1*H_{(i-1)}] \quad (2)$$

wherein $c_3$, $c_2$, $c_1$, $c_0$, $d_3$, $d_2$ and $d_1$ are design parameters of a 6-tap IIR filter. In one embodiment, $c_3=0.0317$, $c_2=-0.0951$, $c_1=0.0951$, $c_0=-0.0317$, $d_3=1.4590$, $d_2=0.9104$, and $d_1=0.1978$.

Filtering module 230 is operable to generate low pass filtered sequence 236 including low pass values (e.g., $L_i$) and high pass filtered sequence 238 including high pass values (e.g., $H_i$).

In one embodiment, a phase shift between low pass filtered sequence 236 and high pass filtered sequence 238 occurs as a result of the filtering. In one embodiment, low pass filtered sequence 236 and high pass filtered sequence 238 are transmitted to phase shift correction module 240 in order to compensate for the phase shift. Phase shift correction module 240 is operable to align low pass filtered sequence 236 and high pass filtered sequence 238, resulting in aligned low pass filtered sequence 246 and aligned high pass filtered sequence 248. In one embodiment, low pass value $L_i$ is aligned according to $L_i=L(i+dl)$ and high pass value $H_i$ is aligned according to $H_i=H(i+dh)$. In one embodiment, dl=7 and dh=4.

The aligned filtered sequences are then transmitted to feature set selection module 250. It should be appreciated that, in various embodiments, no phase shift occurs between low pass filtered sequence 236 and high pass filtered sequence 238. In these embodiments, low pass filtered sequence 236 and high pass filtered sequence 238 are already aligned, thus obviating the need for phase shift correction module 240. Therefore, phase shift correction module 240 is optional.

Feature set selection module 250 is operable to select a feature set of pixels of the image. In one embodiment, feature set 255 includes smooth pixels, wherein a pixel is smooth if the filtered values of the pixel and at least one neighboring pixel are below a threshold value. In one embodiment, feature set 255 is selected from pixels corresponding to a portion of aligned low pass filtered sequence 246 and aligned high pass filtered sequence 248. In one embodiment, feature set selection module 250 receives additional data such as feature set threshold value 252. It should be appreciated that feature set threshold value 252 may be automatically generated or user-defined. Feature set selection module 250 compares feature set threshold value 252 to the filtered values of one of aligned low pass filtered sequence 246 and aligned high pass filtered sequence 248. If the filtered value is less than feature set threshold value 252, the corresponding pixel is selected as a pixel of feature set 255. It should be appreciated that a value based on the filtered value may be compared to feature set threshold value 252. It should be appreciated that a value based on the corresponding values of two or more different aligned filters may be compared to feature set threshold value 252. For example, filtered value squared may be compared to feature set threshold value 252. In one embodiment, a pixel $X_t$ is a feature of feature set 252 if abs($L_t$)<thresh for $X_i$ and neighboring pixels of $X_i$ [t−T, t+T], wherein $L_t$ is a low pass value and ////thresh is a feature set threshold value. In one embodiment, thresh=14 and T=20. Feature set 255 includes the aligned filtered values for the selected pixels.

In some images, highlights or shadows appear in regions where there may be a significant amount of activity, changing the intensity of the signals. The signals are usually muted in highlights and shadow regions. Measuring for noise in a highlight or shadow region may result in the image appearing to have less noise than it actually has. In order to reduce the effects of pixels in highlight or shadow regions, feature set 255 may be further constrained to include pixels in which the image data value is neither too high nor too low. In one embodiment, feature set selection module 250 is operable to further constrain feature set 255 by excluding pixels that are in highlight or shadow regions. In one embodiment, feature set selection module 250 receives image data range 254 [$G^L$, $G^H$]. It should be appreciated that image data range 254 may be automatically generated or user-defined. For example, image data range 254 may be calculated or otherwise extracted from data relating to acquisition or image processing history of the image. This data might be embedded in one of the image tags in the input image file, or otherwise associated with the input image (such as in a database). Feature set selection module 250 compares image data range 254 to the image data value for pixels of aligned low pass filtered sequence 246 and aligned high pass filtered sequence 248. If the image data value is within image data range 254 (e.g., $G^L$<$X_t$<$G^H$), the corresponding pixel is selected as a pixel of feature set 255. In one embodiment, $G^L$=80 and $G^H$=220. Feature set 255 is then transmitted to noise artifact estimation module 260. In one embodiment, feature set size 257 is also transmitted to noise artifact estimation module 260, wherein feature set size 257 indicates the number of pixels of feature set 255.

Noise artifact estimation module 260 is operable to estimate noise artifact estimation 265 based on a portion of the aligned high pass filtered sequences 248 of feature set 255. In one embodiment, noise artifact estimation 265 is determined by calculating the average of the absolute value of the high pass filtered values corresponding to aligned high pass filtered sequences 248 for pixels of feature set 255. For example, noise artifact estimation is mean(abs($H_n$)) over all n pixels of feature set 255. In another embodiment, noise artifact estimation 265 is calculated as the variance of the high pass filtered values corresponding to aligned high pass filtered sequences 248 for pixels of feature set 255. For example, noise artifact estimation is variance ($H_n$) over all n pixels of feature set 255.

In one embodiment, noise artifact estimation module 260 is also operable to determine artifact reliability 270. Artifact reliability 270 can be based on feature set size 257, where a larger feature set size 257 indicates a higher artifact reliability 270. In one embodiment, noise artifact estimation module 260 receives reliability threshold 262. It should be appreciated that reliability threshold 262 may be automatically generated or user-defined. Feature set size 257 is compared to reliability threshold 262. If feature set size 257 is greater than reliability threshold 262, the reliability is determined to be sufficient, as indicated by artifact reliability 270.

Figure 3:
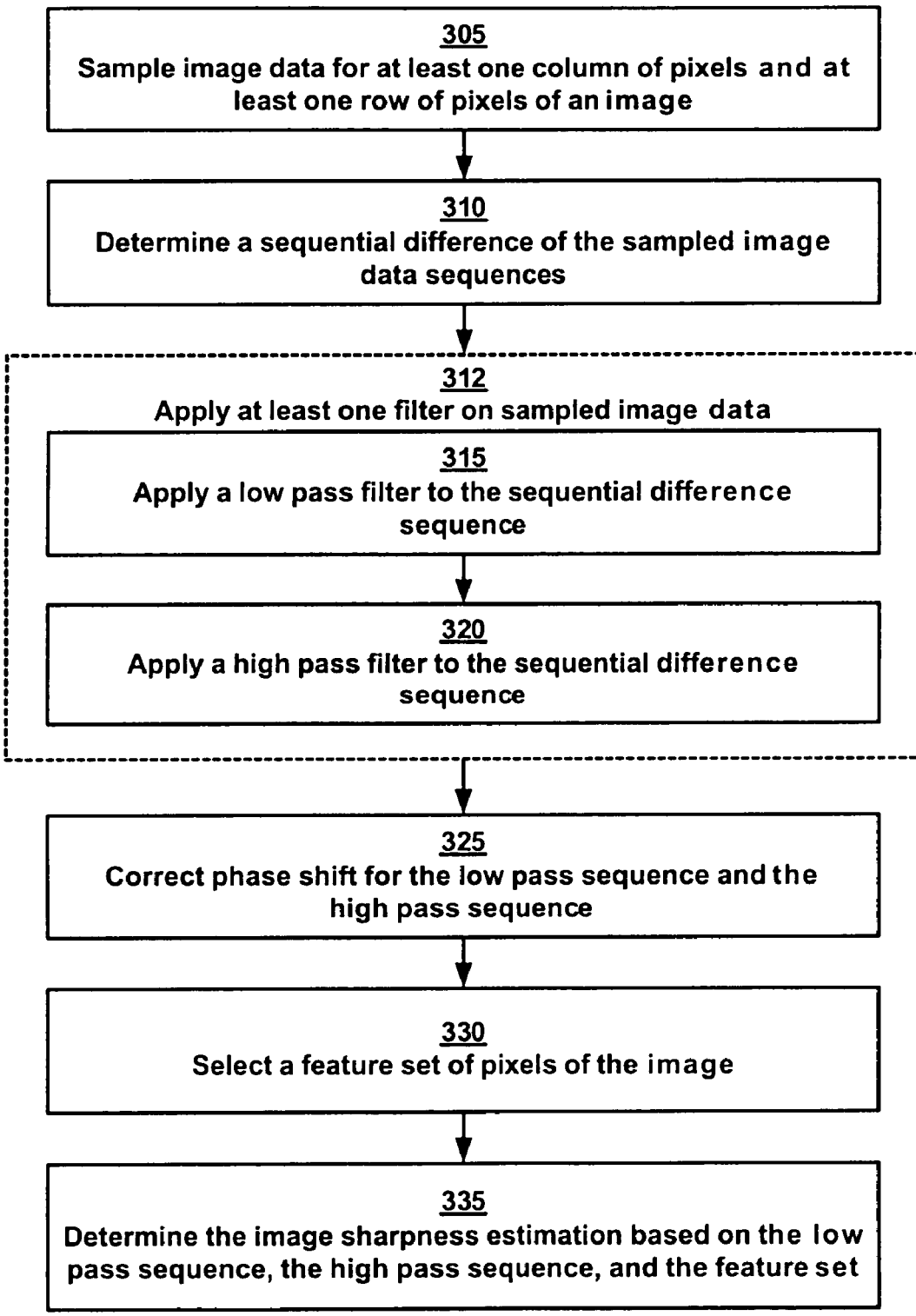
FIG. 3 is a flow chart of a process for estimating noise of an image, in accordance with an embodiment of the present invention.

FIG. 3 is a flow chart of a process 300 for determining image noise, in accordance with an embodiment of the present invention. In one embodiment, process 300 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific steps are disclosed in process 300, such steps are exemplary. That is, the embodiments of the present invention are well suited to performing various other steps or variations of the steps recited in FIG. 3.

At step 305 of process 300, image data for at least one column of pixels or at least one row of pixels of an image is sampled, resulting in at least one sequence of image data. In one embodiment, the sampled image data includes luminance values. In another embodiment, the sampled image data includes color values. In one embodiment, the sampled image data is resampled to emulate the sampling of the image as if the image was a smaller size. At step 310, a sequential difference of the sampled image data for pixels of the sequence of image data is determined, resulting in a sequential difference sequence. It should be appreciated that step 310 is optional.

At step 312, at least one filter is applied on the sampled image data, resulting in at least one sequence of filtered values. In one embodiment, the filter is operable to directly determine the sequential differences of the sampled image data. In one embodiment, the filter is a band pass filter. In another embodiment, where a sequential difference sequence is determined at step 310, a low pass filter and a high pass filter are applied to the sequential difference sequence. At step 315, a low pass filter is applied to the sequential difference sequence, resulting in a low pass sequence of low pass values. At step 320, a high pass filter is applied to the sequential difference sequence, resulting in a high pass sequence of high pass values. In one embodiment, the low pass filter and the high pass filter are 6-tap IIR filters.

At step 325, phase shift for the low pass sequence and the high pass sequence is corrected. It should be appreciated that the low pass sequence and the high pass sequence may already be aligned; thus, step 325 is optional.

At step 330, a feature set of smooth pixels of the image is selected. In one embodiment, pixels of the feature set are selected from the sampled image data if the low pass value for a pixel is less than a threshold value. In one embodiment, a pixel is excluded from the feature set if the image data is not within an accepted image data range, to reduce the effects of shadow and highlight regions of an image.

At step 335, the noise artifact estimation is determined based on the high pass values of the feature set of pixels. In one embodiment, the noise artifact estimation is determined by calculating the average of the absolute value of the high pass values for pixels of the feature set. In another embodiment, the noise artifact estimation is calculated as the variance of the high pass values for pixels of the feature set.

At step 340, the artifact reliability is determined based on the feature set size and a reliability threshold. In one embodiment, the feature set size is compared to the reliability threshold. If the feature set size is greater than the reliability threshold, the reliability is determined to be sufficient, as indicated by the artifact reliability. It should be appreciated that step 340 is optional.

In one embodiment, the noise artifact estimation is used in automatic image sharpness enhancement. For example, an automatic image sharpness enhancement algorithm can be tuned according to the noise artifact estimation. Furthermore, if the noise artifact estimation is very high, enhancement of the noisy image may be avoided.

Embodiments of the present invention provide a method for estimating image noise. Specifically, embodiments of the present invention provide for effective noise estimation by estimating the noise over selected smooth regions of the image. Furthermore, embodiments of the present invention are computationally efficient by performing calculation in one dimensional rows and columns, wherein the rows and columns are sampled from the image.

In particular, embodiments of the present invention estimate image noise by considering only regions that are likely to be texture free and using a measure that minimizes interference of residual texture in those regions. Smooth scene regions are identified as regions with consistently low band-pass activity. Namely, pixels for which not only is there a low band-pass activity, but also all the neighbors have low band-pass activity are identified as smooth pixels. Since texture regions often have many pixels and even small regions with low band-pass activity, smooth regions may be differentiated from texture regions.

Moreover, noise is measured via absolute high-pass content over these smooth regions. As opposed to total activity, high-pass filters filter out more of the typical texture activity than the typical noise activity. Thus, in those cases where texture regions did contribute to texture region the high-pass filters filter out some of their disturbance. Also, compared to square activity, the average activity attributes lower importance to extreme measure values. Feature regions are characterized be extreme activity in specific band regions. Reducing influence of extreme regions reduces the influence of texture in the measure.

Various embodiments of the present invention, a method for estimating image noise, are thus described. While the present invention has been described in particular embodiments, it should be appreciated that the present invention should not be construed as limited by such embodiments, but rather construed according to the following claims.

What is claimed is:

1. A method for estimating image noise, said method comprising:
   sampling image data for at least one of a column and a row of pixels of said image;
   applying at least one filter on sampled image data resulting in at least one sequence of filtered values;
   correcting phase shift for said sequences of filtered values;
   selecting a feature set of pixels of said image; and
   determining an image noise estimation based on at least one of said filtered values and said feature set of pixels.

2. The method as recited in claim 1 wherein said image data comprises luminance values.

3. The method as recited in claim 1 wherein said image data comprises a transformation of said image data.

4. The method as recited in claim 1 wherein said image data comprises sequential differences of said image data.

5. The method as recited in claim 1 wherein said sampling image data further comprises resampling said sampled image data.

6. The method as recited in claim 1 wherein one of said filters is a band pass filter and another of said filters is a high pass filter.

7. The method as recited in claim 1 wherein said selecting said feature set of pixels comprises selecting smooth pixels of said image wherein a function of said filtered values for a pixel is less than a threshold value.

8. The method as recited in claim 7 wherein said selecting said feature set of pixels further comprises selecting smooth pixels of said image wherein a function of said filtered values for a set of neighboring pixels are less than said threshold value.

9. The method as recited in claim 7 wherein said selecting said feature set of pixels comprises selecting smooth pixels of said image wherein said filtered value corresponding to a band pass filter for a pixel is less than said threshold value.

10. The method as recited in claim 7 further comprising excluding a pixel from said feature set provided said image data for said pixel falls outside of an image data range.

11. The method as recited in claim 1 wherein said determining said image noise estimation comprises calculating a function of said filtered values corresponding to pixels of said feature set of pixels.

12. The method as recited in claim 11 wherein said determining said image noise estimation comprises calculating an average of absolute values of said filtered values corresponding to a high pass filter in pixels of said feature set of pixels.

13. The method as recited in claim 11 wherein said determining said image noise estimation comprises calculating variance of said filtered values corresponding to a high pass filter in pixels of said feature set of pixels.

14. The method as recited in claim 1 further comprising determining artifact reliability based on feature set size and a reliability threshold.

15. A computer-readable medium having computer-readable program code embodied therein for causing a computer system to perform a method for estimating image noise, said method comprising:
   sampling image data for at least one of a column and a row of pixels of said image resulting in at least one sequence of image data;
   determining a sequential difference of said image data for pixels of said sequence of image data resulting in a sequential difference sequence;
   applying a low pass filter to said sequential difference sequence resulting in a sequence of low pass values;
   applying a high pass filter to said sequential difference sequence resulting in a sequence of high pass values;
   selecting a feature set of pixels of said image; and
   determining said image noise estimation based on said sequence of high pass values of said feature set of pixels.

16. The computer-readable medium as recited in claim 15 wherein said image data comprises luminance values.

17. The computer-readable medium as recited in claim 15 wherein said image data comprises a transformation of said image data.

18. The computer-readable medium as recited in claim 15 wherein said sampling image data further comprises resampling said sequence of image data.

19. The computer-readable medium as recited in claim 15 wherein said low pass filter and said high pass filter are Infinite Impulse Response (IIR) filters.

20. The computer-readable medium as recited in claim 15 wherein said method further comprises correcting phase shift for said sequence of low pass values and said sequence of high pass values.

21. The computer-readable medium as recited in claim 15 wherein said selecting said feature set of pixels comprises selecting smooth pixels of said image wherein a function of said low pass value for a pixel is less than a threshold value.

22. The computer-readable medium as recited in claim 21 wherein said selecting said feature set of pixels further comprises selecting smooth pixels of said image wherein a function of said low pass values for a set of neighboring pixels are less than said threshold value.

23. The computer-readable medium as recited in claim 21 wherein said method further comprises excluding a pixel from said feature set if said image data for said pixel falls outside of an image data range.

24. The computer-readable medium as recited in claim 15 wherein said determining said image noise estimation comprises calculating a function of said high pass values corresponding to pixels of said feature set of pixels.

25. The computer-readable medium as recited in claim 24 wherein said determining said image noise estimation comprises calculating an average of absolute values of said high pass values corresponding to pixels of said feature set of pixels.

26. The computer-readable medium as recited in claim 24 wherein said determining said image noise estimation comprises calculating variance of said high pass values corresponding to pixels of said feature set of pixels.

27. The computer-readable medium as recited in claim 15 wherein said method further comprises determining artifact reliability based on feature set size and a reliability threshold.

28. A system for determining image noise artifacts of an image, said system comprising:

means for sampling image data for at least one of a column and a row of pixels of said image resulting in at least one sequence of image data;

means for determining a sequential difference of said image data for pixels of said sequence of image data resulting in a sequential difference sequence;

low pass filtering means for applying a low pass filter to said sequential difference sequence resulting in a sequence of low pass values;

high pass filtering means for applying a high pass filter to said sequential difference sequence resulting in a sequence of high pass values;

means for selecting a feature set of pixels of said image; and means for determining said image noise artifacts based on one of said sequence of low pass values and said sequence of high pass values of said feature set of pixels.

29. The system as recited in claim 28 wherein said means for sampling image data further comprises a means for resampling said sequence of image data.

30. The system as recited in claim 28 further comprising means for correcting phase shift for said sequence of low pass values and said sequence of high pass values.

* * * * *